US012490675B2

(12) United States Patent
Farley et al.

(10) Patent No.: US 12,490,675 B2
(45) Date of Patent: Dec. 9, 2025

(54) SYSTEM AND METHOD FOR CONTROLLING HARVESTING IMPLEMENT OPERATION OF AN AGRICULTURAL HARVESTER WHEN A HARVESTING OPERATION CEASES

(71) Applicant: CNH Industrial America LLC, New Holland, PA (US)

(72) Inventors: Herbert M. Farley, Elizabethtown, PA (US); Joel T. Cook, Lititz, PA (US); Cory Douglas Hunt, Millersville, PA (US); Jethro Martin, Ephrata, PA (US)

(73) Assignee: CNH Industrial America LLC, New Holland, PA (US)

( * ) Notice: Subject to any disclaimer, the term of this patent is extended or adjusted under 35 U.S.C. 154(b) by 609 days.

(21) Appl. No.: 17/920,989

(22) PCT Filed: Apr. 26, 2021

(86) PCT No.: PCT/US2021/029047
§ 371 (c)(1),
(2) Date: Oct. 24, 2022

(87) PCT Pub. No.: WO2021/217112
PCT Pub. Date: Oct. 28, 2021

(65) Prior Publication Data
US 2023/0157208 A1 May 25, 2023

Related U.S. Application Data

(60) Provisional application No. 63/014,901, filed on Apr. 24, 2020.

(51) Int. Cl.
*A01D 41/14* (2006.01)
*A01B 69/04* (2006.01)
(Continued)

(52) U.S. Cl.
CPC .......... *A01D 41/141* (2013.01); *A01B 69/008* (2013.01); *A01D 41/145* (2013.01);
(Continued)

(58) Field of Classification Search
CPC .... A01B 69/008; A01D 41/145; A01D 57/04; G01S 7/41; G01S 13/42; G01S 13/88; G01S 13/89; G06Q 10/04; G06Q 50/02
See application file for complete search history.

(56) References Cited

U.S. PATENT DOCUMENTS 6,415,590 B1 * 7/2002 Lohrentz ................ A01D 57/20
56/192
8,966,871 B2 * 3/2015 Nafziger .............. A01D 43/107
56/10.2 A
(Continued)

FOREIGN PATENT DOCUMENTS

CA 3200682 A1 * 2/2024 .......... F15B 13/0401
CN 103826433 B * 10/2017 ........... B62D 55/116
(Continued)

OTHER PUBLICATIONS

International Search Report and Written Opinion for PCT Application No. PCT/US2021/029047 dated Jul. 22, 2021 (13 pages).

*Primary Examiner* — Arpad Fabian-Kovacs
(74) *Attorney, Agent, or Firm* — Buchanan Ingersoll & Rooney PC

(57) ABSTRACT

A system for controlling harvesting implement operation of an agricultural harvester includes a harvesting implement defining a longitudinal axis extending between a forward end of the harvesting implement and an aft end of the harvesting implement. The harvesting implement is configured to be coupled to the agricultural harvester. Moreover, the harvesting implement includes a frame, a reel, and a cutter bar. A controller is configured to receive a first input indicating that a harvesting operation has ceased. Further- (Continued)

more, the controller is configured to initiate a first adjustment to at least one of a fore/aft tilt angle defined between the longitudinal axis of the harvesting implement and a field surface, a position of the reel relative to the frame, or a position of the cutter bar relative to the frame upon receipt of the first input.

20 Claims, 5 Drawing Sheets

(51) Int. Cl.
    *A01D 57/04*     (2006.01)
    *G01S 7/41*     (2006.01)
    *G01S 13/42*     (2006.01)
    *G01S 13/88*     (2006.01)
    *G01S 13/89*     (2006.01)
    *G06Q 10/04*     (2023.01)
    *G06Q 50/02*     (2012.01)

(52) U.S. Cl.
    CPC ............... *A01D 57/04* (2013.01); *G01S 7/41* (2013.01); *G01S 13/42* (2013.01); *G01S 13/88* (2013.01); *G01S 13/89* (2013.01); *G06Q 10/04* (2013.01); *G06Q 50/02* (2013.01)

(56) References Cited

U.S. PATENT DOCUMENTS

| | | | |
|---|---|---|---|
| 9,763,385 B2 | 9/2017 | Digman | |
| 10,517,207 B2 * | 12/2019 | Pankaj | ................ A01D 34/006 |
| 10,959,374 B2 | 3/2021 | Duerksen et al. | |
| 11,375,663 B2 * | 7/2022 | Rotole | ................... A01D 34/07 |
| 11,758,846 B2 * | 9/2023 | Martin | ................ A01D 34/283 |
| | | | 56/10.2 A |
| 12,245,550 B2 * | 3/2025 | Hunt | ..................... A01D 57/12 |
| 2007/0163220 A1 * | 7/2007 | Ehrhart | ................ A01D 41/145 |
| | | | 56/10.2 E |
| 2009/0255248 A1 | 10/2009 | Bitter | |
| 2010/0287898 A1 * | 11/2010 | Ringwald | .............. A01D 46/08 |
| | | | 56/10.2 E |
| 2017/0311541 A1 | 11/2017 | Pankaj et al. | |
| 2019/0021226 A1 | 1/2019 | Dima et al. | |
| 2019/0261555 A1 | 8/2019 | Baldwin et al. | |
| 2019/0307070 A1 | 10/2019 | Dima et al. | |
| 2020/0128745 A1 * | 4/2020 | Bueermann | ............ A01D 57/20 |
| 2020/0163277 A1 * | 5/2020 | Cooksey | ............... A01D 41/127 |
| 2020/0200894 A1 * | 6/2020 | Boydens | ................. G01S 13/42 |

FOREIGN PATENT DOCUMENTS

| | | | | |
|---|---|---|---|---|
| CN | 110637610 A | * | 1/2020 | ............. A01D 67/00 |
| CN | 114651599 A | * | 6/2022 | ............. A01D 65/00 |
| DE | 102016118637 A1 | * | 4/2018 | ............. A01D 57/04 |
| EP | 3300580 A1 | | 4/2018 | |
| EP | 3603379 A1 | * | 2/2020 | ............. A01D 63/02 |
| JP | 6474211 B2 | | 2/2019 | |
| WO | WO-2014105556 A1 | * | 7/2014 | ........... A01F 12/446 |
| WO | 2018/152266 A1 | | 8/2018 | |
| WO | WO-2021222592 A1 | * | 11/2021 | ......... A01D 41/1274 |

* cited by examiner

SYSTEM AND METHOD FOR CONTROLLING HARVESTING IMPLEMENT OPERATION OF AN AGRICULTURAL HARVESTER WHEN A HARVESTING OPERATION CEASES

FIELD OF THE INVENTION

The present disclosure generally relates to agricultural harvesters and, more particularly, to systems and methods for controlling the operation of a harvesting implement of an agricultural harvester when a harvesting operation is ceased.

BACKGROUND OF THE INVENTION

A harvester is an agricultural machine used to harvest and process crops. For instance, a combine harvester may be used to harvest grain crops, such as wheat, oats, rye, barley, corn, soybeans, and flax or linseed. In general, the objective is to complete several processes, which traditionally were distinct, in one pass of the machine over a portion of the field. In this respect, most harvesters are equipped with a detachable header or harvesting implement, which cuts and collects the crop from the field. The harvester also includes a crop processing system, which performs various processing operations (e.g., threshing, separating, etc.) on the harvested crop received from the header. Furthermore, the harvester includes a crop tank, which receives and stores the harvested crop after processing.

Typically, the position of the header relative to the surface of the field is adjustable. For example, when performing a harvesting operation, the header is positioned at a predetermined height above the field surface to permit a cutter bar of the header to sever crops present within the field from their stubble. Conversely, when the harvesting operation is ceased, the header is lifted to a raised or non-operational position above the predetermined height. For example, moving the header to the non-operational position when the harvester reaching the end of the crop row allows the harvester to turn around. However, harvested crops may fall off the header when it is lifted to the raised position.

Accordingly, an improved system and method for controlling the operation of a harvesting implement of an agricultural harvester that addresses one or more of the issues identified above would be welcomed in the technology. For example, an improved system and method for controlling the operation of a harvesting implement of an agricultural harvester when a harvesting operation is ceased would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for controlling harvesting implement operation of an agricultural harvester. The system includes a harvesting implement defining a longitudinal axis extending between a forward end of the harvesting implement and an aft end of the harvesting implement. The harvesting implement is configured to be coupled to the agricultural harvester. Moreover, the harvesting implement includes a frame, a reel, and a cutter bar. A controller is configured to receive a first input indicating that a harvesting operation has ceased. Furthermore, the controller is configured to initiate a first adjustment to at least one of a fore/aft tilt angle defined between the longitudinal axis of the harvesting implement and a field surface, a position of the reel relative to the frame, or a position of the cutter bar relative to the frame upon receipt of the first input.

In another aspect, the present subject matter is directed to a method for controlling harvesting implement operation of an agricultural harvester. The agricultural harvester, in turn, includes a harvesting implement defining a longitudinal axis extending between a forward end of the harvesting implement and an aft end of the harvesting implement. The harvesting implement is configured to be coupled to the agricultural harvester. Moreover, the harvesting implement including a frame, a reel, and a cutter bar. The method includes controlling, with one or more computing devices, an operation of the agricultural harvester such that the agricultural harvester is moved across a field to perform a harvesting operation. Furthermore, the method includes receiving, with the one or more computing devices, a first input indicating that the harvesting operation has ceased. Additionally, after receiving the first input, the method includes initiating, with the one or more computing devices, a first adjustment to at least one of a fore/aft tilt angle defined between the longitudinal axis of the harvesting implement and a field surface, a position of the reel relative to the frame, or a position of the cutter bar relative to the frame.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
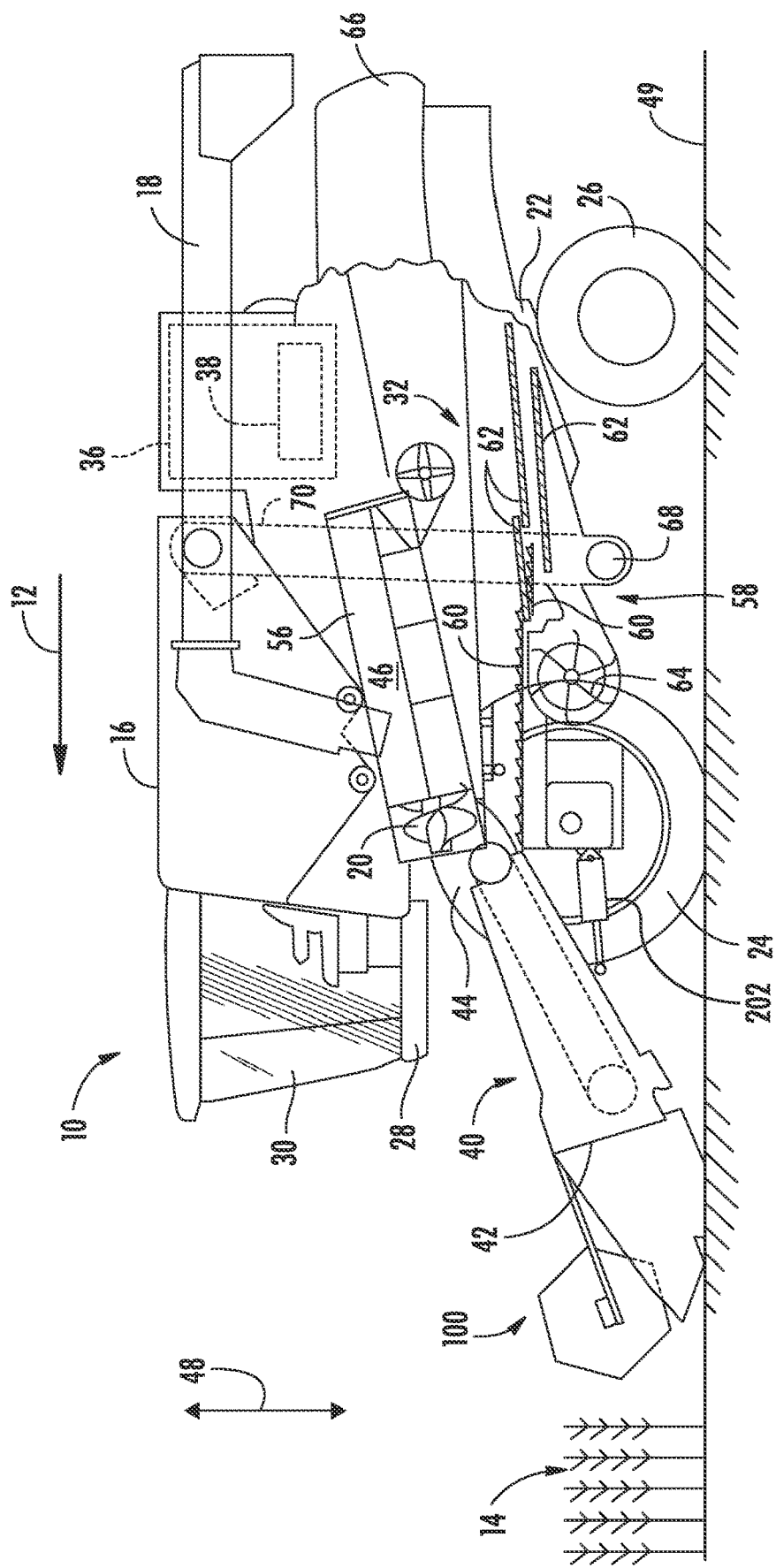
FIG. 1 illustrates a partial sectional side view of one embodiment of an agricultural harvester in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for controlling harvesting implement operation of an agricultural harvester. As will be described below, the present subject matter may be used with a combine or any other suitable agricultural harvester having a header or other harvesting implement for harvesting a crop within a field across which the harvester is traveling. In this respect, the header may include a frame, a cutter bar configured to sever the crops present within the field from their stubble, and reel configured to direct the cut crops onto the header. Additionally, the header may be adjustable between one or more lowered or operational positions and a raised or non-operational position. When in the operational position(s), the header may be positioned at a predetermined height(s) above the field surface to permit the cutter bar of the header to sever crops present within the field from their stubble. Conversely, when in the non-operational position, the header may be lifted above the operational position(s). For example, moving the header to the non-operational position when the harvester reaches the headland at the end of the crop row may allow the harvester to turn around.

In accordance with aspects of the present subject matter, the disclosed system may be configured to adjust one or more components and/or parameters of the header to prevent or reduce the amount of cut crops that fall off the header when the header is lifted from the operational position to the non-operational position. Specifically, in several embodiments, a controller of the disclosed system may be configured to receive an input (e.g., from the operator or a location sensor) indicating that the harvester has reached a headland or otherwise ceased a harvesting operation. Upon receipt of this input, the controller may be configured to initiate an adjustment to the fore/aft tilt angle of the header, the position of the reel relative to the header frame, and/or the position of the cutter bar relative to the header frame. For example, in one embodiment, upon receipt of the input, the controller may be configured to control the operation of one or more actuators such that the reel is lowered and/or moved rearward relative to the header frame, the cutter bar is lifted relative to the header frame, and/or the fore-aft tilt angle of the header is adjusted such that an aft end of the header is closer to the field surface than a forward end of the header.

Referring now to the drawings, FIG. 1 illustrates a partial sectional side view of the agricultural harvester 10. In general, the harvester 10 may be configured to travel across a field in a forward direction of travel (indicated by arrow 12) to harvest a crop 14. While traversing the field, the harvester 10 may be configured to process and store the harvested crop within a crop tank 16 of the harvester 10. Furthermore, the harvested crop may be unloaded from the crop tank 16 for receipt by the crop receiving vehicle (not shown) via a crop discharge tube 18 of the harvester 10. Moreover, as shown, in the illustrated embodiment, the harvester 10 is configured as an axial-flow type combine in which the harvested crop is threshed and separated while being advanced by and along a longitudinally arranged rotor 20. However, in alternative embodiments, the harvester 10 may have any other suitable harvester configuration, such as a traverse-flow type configuration.

The harvester 10 may include a chassis or main frame 22 configured to support and/or couple to various components of the harvester 10. For example, in several embodiments, the harvester 10 may include a pair of driven, front wheels 24 and a pair of steerable, rear wheels 26 coupled to the frame 22. As such, the wheels 24, 26 may be configured to support the harvester 10 relative to the ground and move the harvester 10 in the forward direction of travel 12. Furthermore, the harvester 10 may include an operator's platform 28 having an operator's cab 30, a crop processing system 32, the crop tank 16, and the crop discharge tube 18 that are supported by the frame 22. As will be described below, the crop processing system 32 may be configured to perform various processing operations on the harvested crop as the crop processing system 32 transfers the harvested crop between a harvesting implement of the harvester 10, such as a header 100, and the crop tank 16. Furthermore, the harvester 10 may include an engine 36 and a transmission 38 mounted on the frame 22. The transmission 38 may be operably coupled to the engine 36 and may provide variably adjusted gear ratios for transferring engine power to the wheels 24 via a drive axle assembly (or via axles if multiple drive axles are employed).

Moreover, as shown in FIG. 1, the header 100 and an associated feeder 40 of the crop processing system 32 extend forward of the frame 22 and are pivotably secured thereto for generally vertical movement. In general, the feeder 40 may support the header 100. As shown in FIG. 1, the feeder 40 extend between a front end 42 coupled to the header 100 and a rear end 44 positioned adjacent to a threshing and separating assembly 46 of the crop processing system 32. The rear end 44 of the feeder 40 may, in turn, be pivotably coupled to a portion of the harvester 10. In this respect, the front end 42 of the feeder 40 and, thus, the header 100 may be moved upward and downward along a vertical direction (indicated by arrow 48) relative to a field surface 49. For example, the header 100 may be moved between one or more lowered or operational positions and a raised or non-operational position (sometimes referred to as headland position). As such, the harvester 10 may include one or more lift actuators 202 configured to adjust the height of the header 100 relative to the field surface 49.

As the harvester 10 is propelled in the forward direction of travel 12 over the field with the crop 14, the crop material is severed from the stubble by a cutter bar or sickle bar 102 (FIG. 2) at the front of the header 100 and delivered to the front end 42 of the feeder 40. The feeder 40 may, in turn, supply the harvested crop to the threshing and separating assembly 46. In general, the threshing and separating assembly 46 may include a cylindrical chamber 56 in which the rotor 20 is rotated to thresh and separate the harvested crop received therein. That is, the harvested crop is rubbed and beaten between the rotor 20 and the inner surfaces of the chamber 56 to loosen and separate the grain, seed, or the like from the straw.

The harvested crop separated by the threshing and separating assembly 46 may fall onto a crop cleaning assembly 58 of the crop processing system 34. In general, the crop cleaning assembly 58 may include a series of pans 60 and associated sieves 62. The separated harvested crop may be spread out via the oscillation of pans 60 and/or sieves 62 and may eventually fall through apertures defined by the sieves 62. Additionally, a cleaning fan 64 may be positioned adjacent to one or more of the sieves 62 to provide an air flow through the sieves 62 that removes chaff and other impurities from the harvested crop. For instance, the fan 64 may blow the impurities off the harvested crop for discharge from the harvester 10 through the outlet of a straw hood 66 positioned at the back end of the harvester 10. The cleaned harvested crop passing through the sieves 62 may then fall into a trough of an auger 68, which may be configured to transfer the harvested crop to an elevator 70 for delivery to the crop tank 16.

Figure 2:
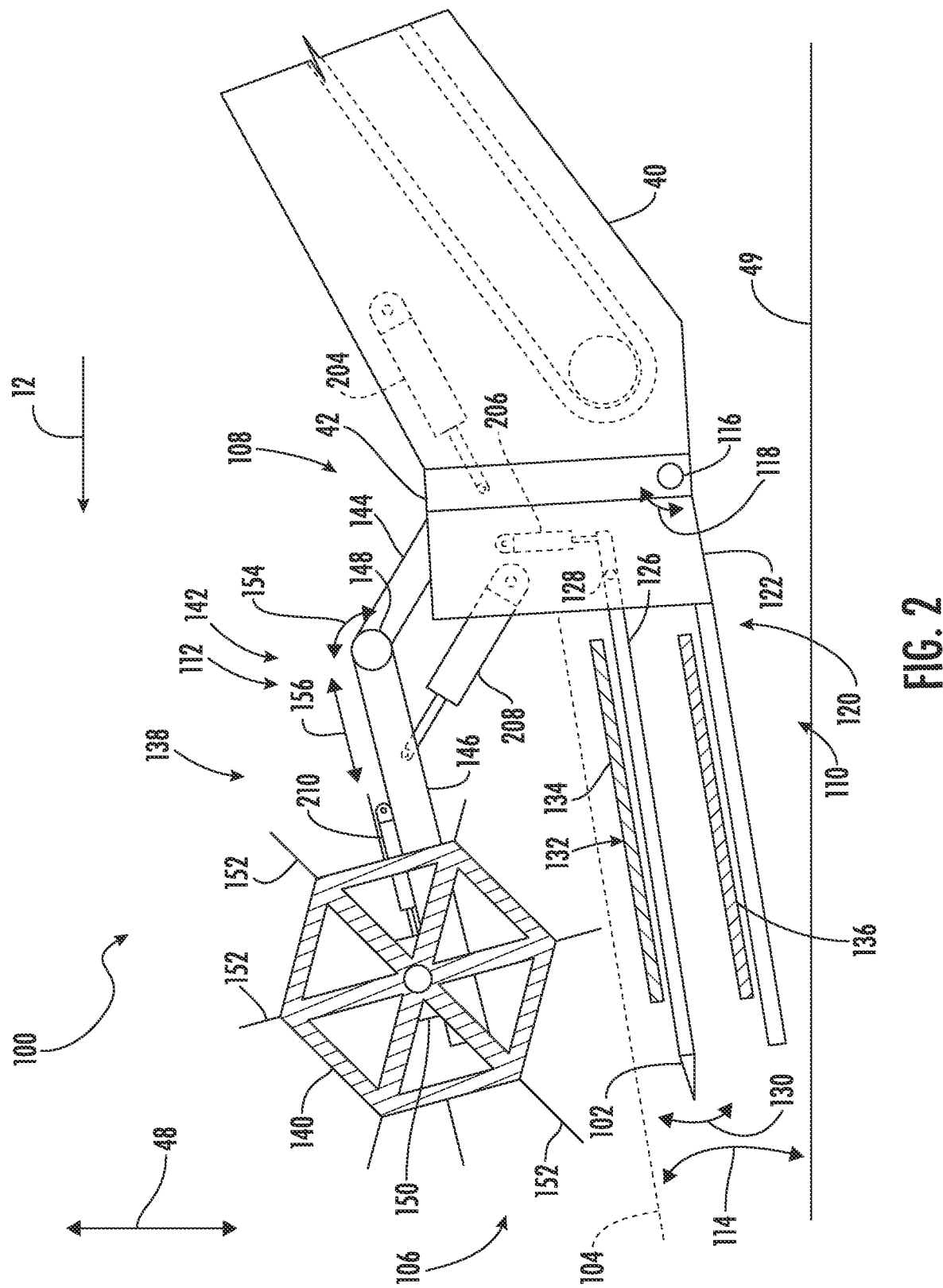
FIG. 2 illustrates a cross-sectional view of one embodiment of a harvesting implement of an agricultural harvester in accordance with aspects of the present subject matter.

Referring now to FIG. 2, a cross-sectional view of one embodiment of a header 100 is illustrated in accordance with aspects of the present subject matter. In the illustrated embodiment, the header 100 is configured as a draper header. However, in alternative embodiments, the header 100 may be configured as any other suitable type of harvesting implement, such as an auger header. Additionally, as shown, the header 100 defines a longitudinal axis (indicated dashed line 104) extending between a forward end 106 of the header 100 and an aft end 108 of the header 100. Furthermore, the header 100 extends in the vertical direction 48 between a bottom end 110 of the header 100 and a top end 112 of the header 100.

In several embodiments, the header 100 may be coupled to the feeder 40 to permit a fore/aft tilt angle (indicated by arrow 114) of the header 100 to be adjusted. As used herein, the "fore/aft tilt angle" is the angle defined between the longitudinal axis 104 of the header 100 and the field surface 49. Specifically, in one embodiment, the header 100 may be pivotably coupled to the front end 42 of the feeder 40 at a pivot joint 116. In such an embodiment, the harvester 10 may include one or more tilt actuators 204 configured to adjust the fore/aft tilt angle 104 of the header 100 by pivoting the header 100 relative to the feeder 40 about the pivot joint 116 (e.g., as indicated by the arrow 118 in FIG. 2). In this respect, adjusting the fore/aft tilt angle of header 100 may position one of the forward or aft ends 106, 108 of the header 100 closer to the field surface 49 than the other of the forward or aft ends 106, 108 of the header 100. However, in alternative embodiments, the header 100 may be fixedly coupled to the feeder 40.

Moreover, the header 100 may include a frame 120 configured to support and/or couple to a plurality of components of the header 100. Specifically, in several embodiments, the frame 120 may include an aft frame portion 122 coupled to the forward end 42 of the feeder 40 (e.g., via the pivot joint 116). As shown, the frame 120 supports a cutter bar or sickle bar 102 positioned at the forward end 106 of the header 100. The cutter bar 102 may include a plurality of knives or teeth (not shown) configured to sever the crop 14 (FIG. 1) present within the field from the stubble. In one embodiment, the cutter bar 102 may be coupled to a plurality of arms 126 (one is shown). Each arm 126 may, in turn, extend rearward such that it is pivotably coupled to the aft frame portion 122 at a pivot joint 128. In such an embodiment, one or more cutter bar adjustment actuators 206 may be configured to adjust the position of cutter bar 102 by pivoting the arms 126 relative to the aft frame portion 122 about the pivot joint 128 (e.g., as indicated by the arrow 130 in FIG. 2). Pivoting the arms 126 in this manner may raise and lower the cutter bar 102 relative to the header frame 120. Additionally, the header frame 120 may be configured to support a plurality of conveyor belts 132 (one is shown) configured to transport the severed crop material from the cutter bar 102 to the feeder 40. For example, in one embodiment, as shown, the arms 126 supporting the cutter bar 102 extend between a top span 134 of each conveyor belt 132 and a lower span 136 of each conveyor belt 132. However, in alternative embodiments, the header 100 may include any other suitable components and/or be configured in any other suitable manner. For example, in one embodiment, the header 100 may include one or more augers (not shown) in lieu of the conveyor belts 132.

Furthermore, the header 100 may include a reel assembly 138 positioned adjacent to the top end 112 of the header 100. In general, the reel assembly 138 may be configured to direct the crop material severed by the cutter bar 102 onto the conveyor belts 132. Specifically, in several embodiments, the reel assembly 138 may include a reel 140 and a support arm 142 configured to support the reel 140 to the header frame 120. In one embodiment, the support arm 142 may include a first support arm portion 144 coupled the aft frame portion 122 of the header 100. Moreover, the support arm 142 may include a second support arm portion 146 extending forward from and pivotably coupled to the first support arm portion 144 at a pivot joint 148. In such an embodiment, the reel 140 may be rotatably coupled to a pillow block 150 configured to slide along the second support arm portion 146. Additionally, in some embodiments, the reel 140 may include a plurality of tines 152, with the tines 152 arranged circumferentially around the reel 140. However, in alternative embodiments, the reel assembly 138 may be configured in any other suitable manner.

In several embodiments, the reel assembly 138 may include various actuators configured to adjust the position of the reel 140 relative to the header frame 120. For example, in one embodiment, the reel assembly 138 may include one or more lift actuators 208 configured to adjust the position of the reel 140 in the vertical direction 48 by pivoting the second support arm portion 146 relative to the first support arm portion 144 by about the pivot joint 148 (e.g., as indicated by the arrow 154 in FIG. 2). Moreover, in such an embodiment, the reel assembly 140 may include one or more slide actuators 210 configured to adjust the position of the reel 140 along the longitudinal axis 104 of the header 100 by sliding the pillow block 150 relative to the second support arm portion 146 (e.g., as indicated by the arrow 156 in FIG. 2). As such, the actuators 208, 210 may permit the reel 140 to moved forward, aft, up, and down relative to the header frame 120 and the cutter bar 102. However, in alternative embodiments, the reel assembly 140 may include any other suitable actuators configured to adjust the position of the reel 140 relative to the header frame 120.

The actuators 202, 204, 206, 208, 210 may correspond to any suitable types of actuating devices. For example, in the illustrated embodiment, the actuators 202, 204, 206, 208, 210 correspond to fluid-driven cylinders (e.g., hydraulic or pneumatic cylinders). However, in alternative embodiments, the actuators 202, 204, 206, 208, 210 may correspond to electric linear actuators and/or the like.

It should be further appreciated that the configurations of the agricultural harvester 10 and the header 100 described above and shown in FIGS. 1 and 2 are provided only to place the present subject matter in an exemplary field of use. Thus, it should be appreciated that the present subject matter may be readily adaptable to any manner of agricultural harvester and/or harvesting implement configurations.

Figure 3:
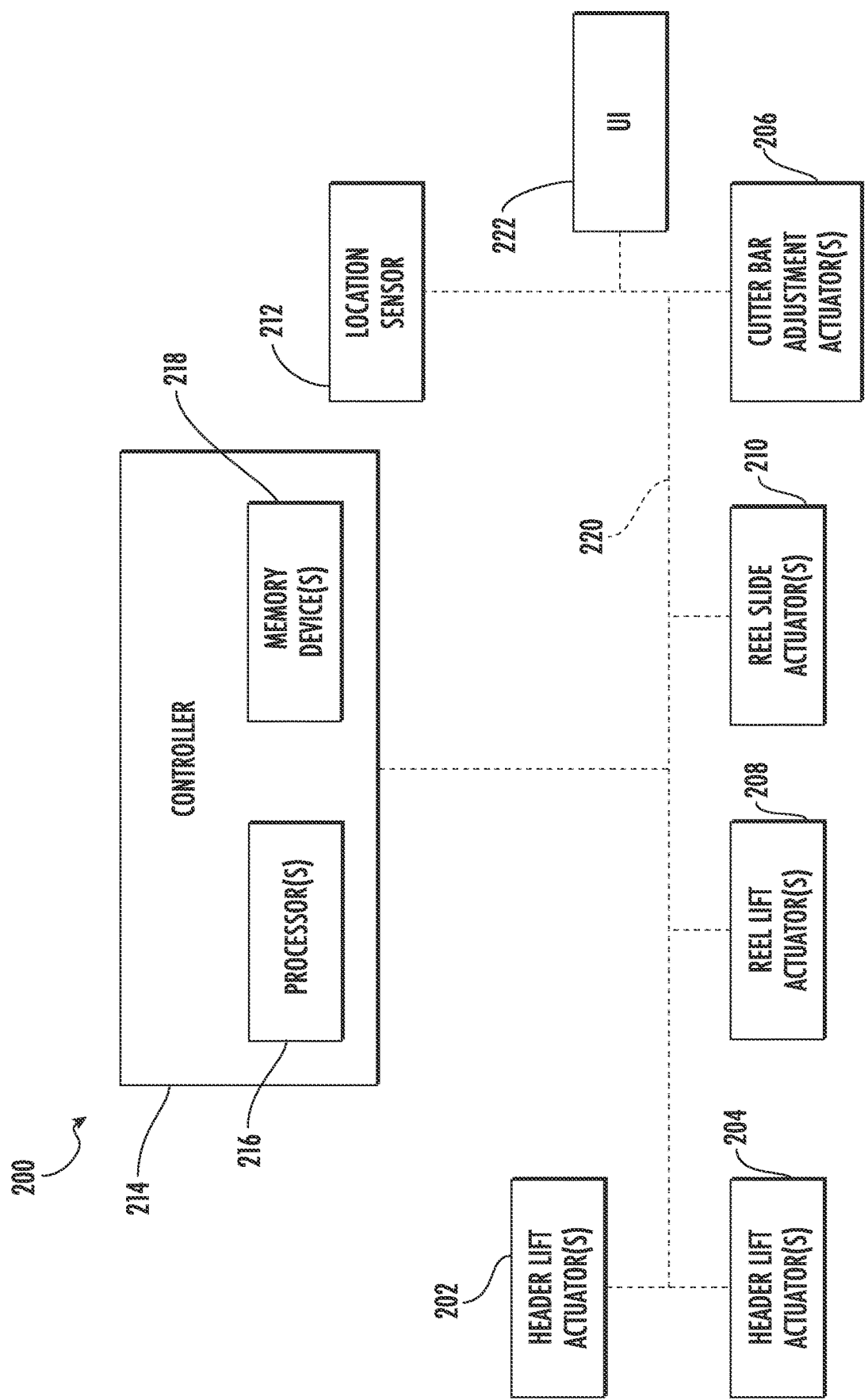
FIG. 3 illustrates a schematic view of one embodiment of a system for controlling harvesting implement operation of an agricultural harvester in accordance with aspects of the present subject matter.

Referring now to FIG. 3, a schematic view of one embodiment of a system 200 for controlling harvesting implement operation of an agricultural harvester is illustrated in accordance with aspects of the present subject matter. In general, the system 200 will be described herein with reference to the agricultural harvester 10 and the header 100 described above with reference to FIGS. 1 and 2. However, it should be appreciated by those of ordinary skill in the art that the disclosed system 200 may generally be utilized with agricultural harvesters having any other suitable harvester configuration and/or harvesting implements having any other suitable harvesting implement configuration.

As shown in FIG. 3, the system 100 may include a location sensor 212 provided in operative association with the agricultural harvester 10. In general, the location sensor 212 may be configured to capture data indicative of the current location of the harvester 10 within the field. Specifically, in several embodiments, the location sensor 212 may be configured as a GNSS-based satellite navigation positioning system (e.g. a GPS system, a Galileo positioning system, the Global Navigation satellite system (GLONASS), the BeiDou Satellite Navigation and Positioning system, and/or the like). In such embodiments, the location data captured by the location sensor 212 may be transmitted to a controller(s) of the harvester 10 (e.g., in the form coordinates) and stored within the controller's memory for subsequent processing and/or analysis. For instance, based on the known dimensional configuration and/or relative positioning between the location sensor 212 and the header 100 of the vehicle 10, the location data from the location sensor 212 may be used to geo-locate or otherwise determine the current location of the header 100 within the field.

In accordance with aspects of the present subject matter, the system 200 may include a controller 214 positioned on and/or within or otherwise associated with the harvester 10 (e.g., mounted within the harvester 10 or the header 100). In general, the controller 214 may comprise any suitable processor-based device known in the art, such as a computing device or any suitable combination of computing devices. Thus, in several embodiments, the controller 214 may include one or more processor(s) 216 and associated memory device(s) 218 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 218 of the controller 214 may generally comprise memory element(s) including, but not limited to, a computer readable medium (e.g., random access memory (RAM)), a computer readable non-volatile medium (e.g., a flash memory), a floppy disc, a compact disc-read only memory (CD-ROM), a magneto-optical disc (MOD), a digital versatile disc (DVD), and/or other suitable memory elements. Such memory device(s) 218 may generally be configured to store suitable computer-readable instructions that, when implemented by the processor(s) 216, configure the controller 214 to perform various computer-implemented functions.

In addition, the controller 214 may also include various other suitable components, such as a communications circuit or module, a network interface, one or more input/output channels, a data/control bus and/or the like, to allow controller 214 to be communicatively coupled to any of the various other system components described herein (e.g., the actuators 202, 204, 206, 208, 210 and the location sensor 212). For instance, as shown in FIG. 3, a communicative link or interface 220 (e.g., a data bus) may be provided between the controller 214 and the components 202, 204, 206, 208, 210, 212 to allow the controller 214 to communicate with such components 202, 204, 206, 208, 210, 212 via any suitable communications protocol (e.g., CANBUS).

The controller 214 may correspond to an existing controller(s) of the harvester 10, itself, or the controller 214 may correspond to a separate processing device. For instance, in one embodiment, the controller 214 may form all or part of a separate plug-in module that may be installed in association with the harvester 10 to allow for the disclosed systems to be implemented without requiring additional software to be uploaded onto existing control devices of the implement harvester 10.

The functions of the controller 214 may be performed by a single processor-based device or may be distributed across any number of processor-based devices, in which instance such devices may be considered to form part of the controller 214. For instance, the functions of the controller 214 may be distributed across multiple application-specific controllers, such as a navigation controller, an engine controller, a header controller, and/or the like.

Furthermore, in one embodiment, the system 200 may also include a user interface 222. More specifically, the user interface 222 may be configured to receive input (e.g., input indicating that a harvesting operation has been ceased or resumed) from the operator of the harvester 10. As such, the user interface 222 may include one or more input devices (not shown), such as touchscreens, keypads, touchpads, knobs, buttons, sliders, switches, mice, microphones, and/or the like, which are configured to receive user inputs from the operator. The user interface 222 may, in turn, be communicatively coupled to the controller 214 via the communicative link 220 to permit the feedback to be transmitted from the user interface 222 to the controller 214. In addition, some embodiments of the user interface 222 may include one or more feedback devices (not shown), such as display screens, speakers, warning lights, and/or the like, which are configured to provide feedback from the controller 214 to the operator. In one embodiment, the user interface 222 may be mounted or otherwise positioned within the operator's cab 30 of the harvester 10. However, in alternative embodiments, the user interface 222 may mounted at any other suitable location.

In several embodiments, the controller 214 may be configured to control the operation of the agricultural harvester 10 such that the harvester 10 is moved across a field to perform a harvesting operation. For example, the controller 214 may be configured to control operation of one or more components of the harvester 10 (e.g., the engine 36, the transmission 38, and/or the crop processing system 32) such that harvester 10 travels across the field in the forward direction of travel 12, thereby performing a harvesting operation on the field.

Additionally, the controller 214 may be configured to receive a first input indicating that the harvesting operation being performed by the harvester 10 has ceased. For example, the harvesting operation may cease when the harvester 10 (and, more specifically, the header 100) reaches a headland region of the field, such as at the end of one or more crop rows within the field. As will be described below, when the harvesting operation has ceased, the header 100 may be lifted from a lowered or operational position to a raised or non-operational position to facilitate movement of the harvester 10 within the headland region.

In one embodiment, the controller 214 may be configured to receive the first input from the operator of the harvester 10. As described above, the harvester 10 may include a user interface 222 configured to receive inputs from the operator. In this respect, when the harvesting operation being performed by the harvester 10 has ceased, the operator may interact with the user interface 222 (e.g., by pressing a button or otherwise engaging an interface element) to provide the first input. Upon receipt of the first input, the user interface 222 transmit data associated with the input to the controller 214 (e.g., via the communicative link 220).

In another embodiment, the controller 214 may be configured to receive the first input from the location sensor 212. As described above, the location sensor 212 may be configured to capture data indicative of the current location of the harvester 10 within the field. In this respect, as the harvester 10 travels across the field, the controller 214 may be configured to receive the captured location data from the location sensor 212 (e.g., via the communicative link 220). Based on the received location data, the controller 214 may then access a field map stored within its memory 218 to determine location of the header 100 relative to one or more crop rows and/or headland regions present within the field.

As used herein, a "field map" may generally correspond to any suitable dataset that correlates data to various locations within a field. Thus, for example, a field map may simply correspond to a data table that provides the locations of the crop rows and/or headland regions present within the field. Alternatively, a field map may correspond to a more complex data structure, such as a geospatial numerical model that can be used to identify the locations of the crop rows and/or headland regions present within the field.

In accordance with aspects of the present subject matter, the controller 214 may be configured to initiate an adjustment to one or more components and/or operating parameters of the header 100 when the harvesting operation being performed by the harvester 10 is ceased. More specifically, when the harvester 10 ceases a harvesting operation, the header 100 may be lifted from a lowered or operational position to a raised or non-operational position. This movement of the header 100 may cause the harvested crop material present on the header 100 (i.e., crop material that has not yet entered the feeder 40) to fall off the header 100. The crop material that falls off the header 100 is, in turn, wasted. As such, upon receipt of the first input (thereby indicating that the harvester 10 has ceased the harvesting operation), the controller 214 may be configured to initiate an adjustment to the position of the reel 140 relative to the header frame 120, the position of the cutter bar 102 relative to the header frame 120, and/or the fore/aft tilt angle of the header 100. As will be described below, such adjustment(s) may, in turn, prevent or reduce the amount of harvested crop material that falls off the header 100 when the header 100 is lifted from the operational position to the non-operational position.

Figure 4:
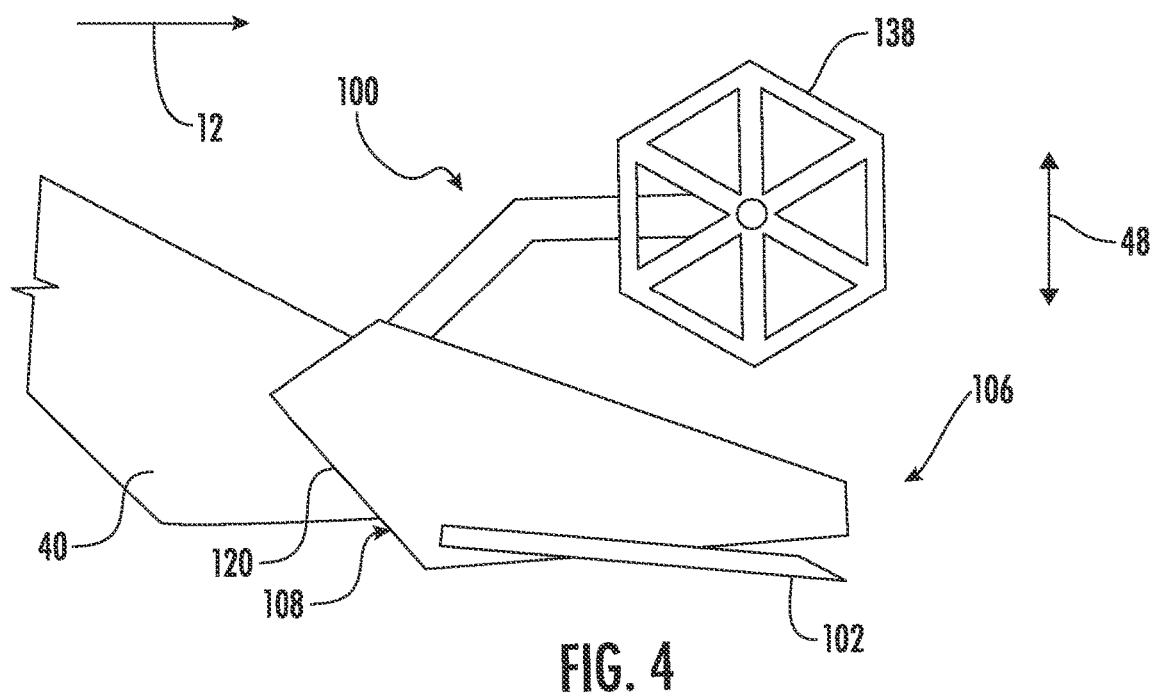
FIG. 4 illustrates a simplified side view of one embodiment of a harvesting implement of an agricultural harvester in accordance with aspects of the present subject matter, particularly illustrating the harvesting implement being positioned at a harvesting or operational position.
Figure 5:
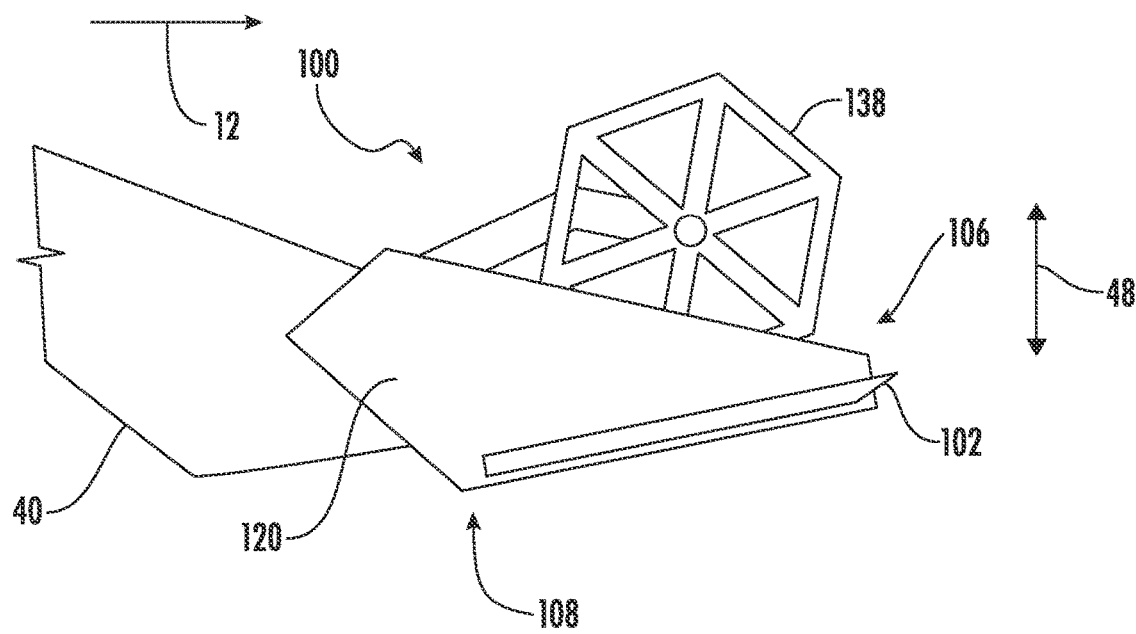
FIG. 5 illustrates another simplified side view of one embodiment of a harvesting implement of an agricultural harvester in accordance with aspects of the present subject matter, particularly illustrating the harvesting implement being positioned at a headland or non-operational position.

In several embodiments, upon receipt of the first input, the controller 214 may be configured to control the operation of the reel lift actuator(s) 208 to lower the position of the reel 140 relative to header frame 120. More specifically, as shown in FIG. 4, during the performance of the harvesting operation, the reel 140 is located at a predetermined position above the header frame 120 such that the reel 140 directs the crop material severed by the cutter bar 102 onto the conveyor belts 132. When the first input is received (thereby indicating that the harvester 10 has ceased the harvesting operation), the controller 214 may be configured to transmit control signals to the reel lift actuator(s) 208 (e.g., via the communicative link 208). The control signals may, in turn, instruct the actuator(s) 208 to lower the reel 140 in the vertical direction 48 relative to the header frame 120 as shown in FIG. 5, such as to the lowest position of the reel 140 in the vertical direction 48. Lowering the reel 140 relative to header frame 120 may retain the harvested crop materials on the header 100 as the header 100 is lifted to the non-operational position.

Additionally, in several embodiments, upon receipt of the first input, the controller 214 may be configured to control the operation of the reel slide actuator(s) 210 to move the reel 140 rearward relative to header frame 120. More specifically, as shown in FIG. 4, during the performance of the harvesting operation, the reel 140 is located at a predetermined position adjacent to the forward end 106 of the header 100 such that the reel 140 directs the crop material severed by the cutter bar 102 onto the conveyor belts 132. When the first input is received (thereby indicating that the harvester 10 has ceased the harvesting operation), the controller 214 may be configured to transmit control signals to the reel slide actuator(s) 210 (e.g., via the communicative link 208). The control signals may, in turn, instruct the actuator(s) 210 to move the reel 140 rearward relative to the forward direction of travel 12 as shown in FIG. 5, such as to the rearmost position of the reel 140. Moving the reel 140 rearward relative to header frame 120 may pull crop material hanging off the forward end 106 of the header 100 onto the header 100, thereby preventing such crop material from falling off the header 100 as the header 100 is lifted to the non-operational position.

In general, the above-described adjustments to the position of the reel 140 sweep the reel 140 across the cutter bar 102, thereby cleaning crop material off the cutter bar 102. More specifically, the reel 140 is typically positioned in front of the cutter bar 102 during a harvesting operation. In such instances, the reel 140 may be lowered and then moved rearward across the cutter bar 102 to sweep the crop material present on the cutter bar 102 onto the conveyor belts 132. However, in certain instances, the reel 140 may be positioned behind of the cutter bar 102 during the harvesting operation. In such instances, the reel 140 may be initially moved forward of the cutter bar 102. Thereafter, the reel 140 may be lowered and then moved rearward across the cutter bar 102 to sweep the crop material present on the cutter bar 102 onto the conveyor belts 132.

Furthermore, in several embodiments, upon receipt of the first input, the controller 214 may be configured to control the operation of the cutter bar adjustment actuator(s) 206 to raise the cutter bar 102 relative to header frame 120. More specifically, as shown in FIG. 4, during the performance of the harvesting operation, the cutter bar 102 is located at a lowered position relative to the header frame 120 to permit the cutter bar 102 to sever the crops present within the field from their stubble. When the first input is received (thereby indicating that the harvester 10 has ceased the harvesting operation), the controller 214 may be configured to transmit control signals to the cutter bar adjustment actuator(s) 206 (e.g., via the communicative link 208). The control signals may, in turn, instruct the actuator(s) 206 to raise the cutter bar 102 in the vertical direction 48 relative to the header frame 120 as shown in FIG. 5, such as to the highest position of the cutter bar 102 in the vertical direction 48. Raising the cutter bar 102 relative to header frame 120 may prevent crop material from falling off the forward end 106 of the header 100 as the header 100 is lifted to the non-operational position. Moreover, such an adjustment may also bring the cutter bar 102 closer to the reel 140 to allow the reel 140 to better sweep the crop material present on the cutter bar 102 onto the conveyor belts 132.

Moreover, in several embodiments, upon receipt of the first input, the controller 214 may be configured to control the operation of the header tilt actuator(s) 204 to adjust the fore/aft tilt angle of the header 100. More specifically, as shown in FIG. 4, during the performance of the harvesting operation, the fore/aft tilt angle of the header 100 is set such that the forward end 106 of the header 100 is closer to the field surface than the aft end 108 of the header 100. Such positioning permits the cutter bar 102 to sever the crops present within the field from their stubble. When the first input is received (thereby indicating that the harvester 10 has ceased the harvesting operation), the controller 214 may be configured to transmit control signals to the header tilt actuator(s) 204 (e.g., via the communicative link 208). The control signals may, in turn, instruct the actuator(s) 204 to adjust the fore/aft tilt angle of the header 100 such that the aft end 108 of the header 100 is closer to the field surface than the forward end 106 of the header 100 as shown in FIG. 5 or to a flatter angle. Adjusting the fore-aft tilt angle in this manner may prevent crop material from falling off the forward end 106 of the header 100 as the header 100 is lifted to the non-operational position.

The adjustment(s) to the position of the reel 140, the position of the cutter bar 102, and/or the fore/aft tilt angle of the header 100 made be performed in any suitable order. In several embodiments, such adjustment(s) may be performed sequentially. For example, in one embodiment, the cutter bar 102 may be raised first, the fore/aft tilt angle of the header 100 may be adjusted second, the reel 140 may be lowered third, and the reel 140 may be moved rearward fourth. In another embodiment, such adjustments may be performed simultaneously.

After the adjustment(s) to the position of the reel 140, the position of the cutter bar 102, and/or the fore/aft tilt angle of the header 100 are performed, the controller 214 may be configured to control the operation of the header lift actuator(s) 202 to lift the header 100 to the non-operational position. Specifically, the controller 214 may be configured to transmit control signals to the header lift actuator(s) 202 (e.g., via the communicative link 208). The control signals may, in turn, instruct the actuator(s) 202 to adjust the adjust the position of the header 100 in the vertical direction 48 relative to the field surface such that the header 100 is lifted from the operational position to the non-operational position. Raising the header 100 to the non-operational position may allow the harvester 10 to more easily travel across a headland, such as to turn around at the end of one or more crop rows.

In addition, the controller 214 may be configured to initiate another adjustment to one or more components and/or operating parameters of the header 100 when the harvesting operation being performed by the harvester 10 is resumed. More specifically, a harvesting operation that was ceased may be subsequently resumed, such as after the harvester 10 has turned around in a headland region. In such instances, the controller 214 may be configured to receive a second input indicating that the harvesting operation being performed by the harvester 10 is being resumed (e.g., from the user interface 222 or the location sensor 212). Upon receipt of the second input, the controller 214 may be configured to initiate another adjustment to the position of the reel 140 relative to the header frame 120, the position of the cutter bar 102 relative to the header frame 120, and/or the fore/aft tilt angle of the header 100. For example, the controller 214 may be configured to control the operation of the actuators 204, 206, 208, 210 such that the reel 140 is raised and/or moved rearward relative to the header frame 120, the cutter bar 102 is lowered relative to the header frame 120, and the fore/aft tilt angle of the header 100 is adjusted such that the forward end 106 of the header 100 is closer to the field surface than the aft end 108 of the header 100. Such adjustment(s) may facilitate harvesting of the crops present within the field as the harvester 10 travels across the field in the direction of travel 12. After such adjustment(s) is made, the controller 214 may be configured to control the operation of the header lift actuator(s) 202 to lower the header 100 relative to the field surface from the non-operational position to the operational position. Thereafter, the harvester 10 may resume the harvesting operation.

Figure 6:
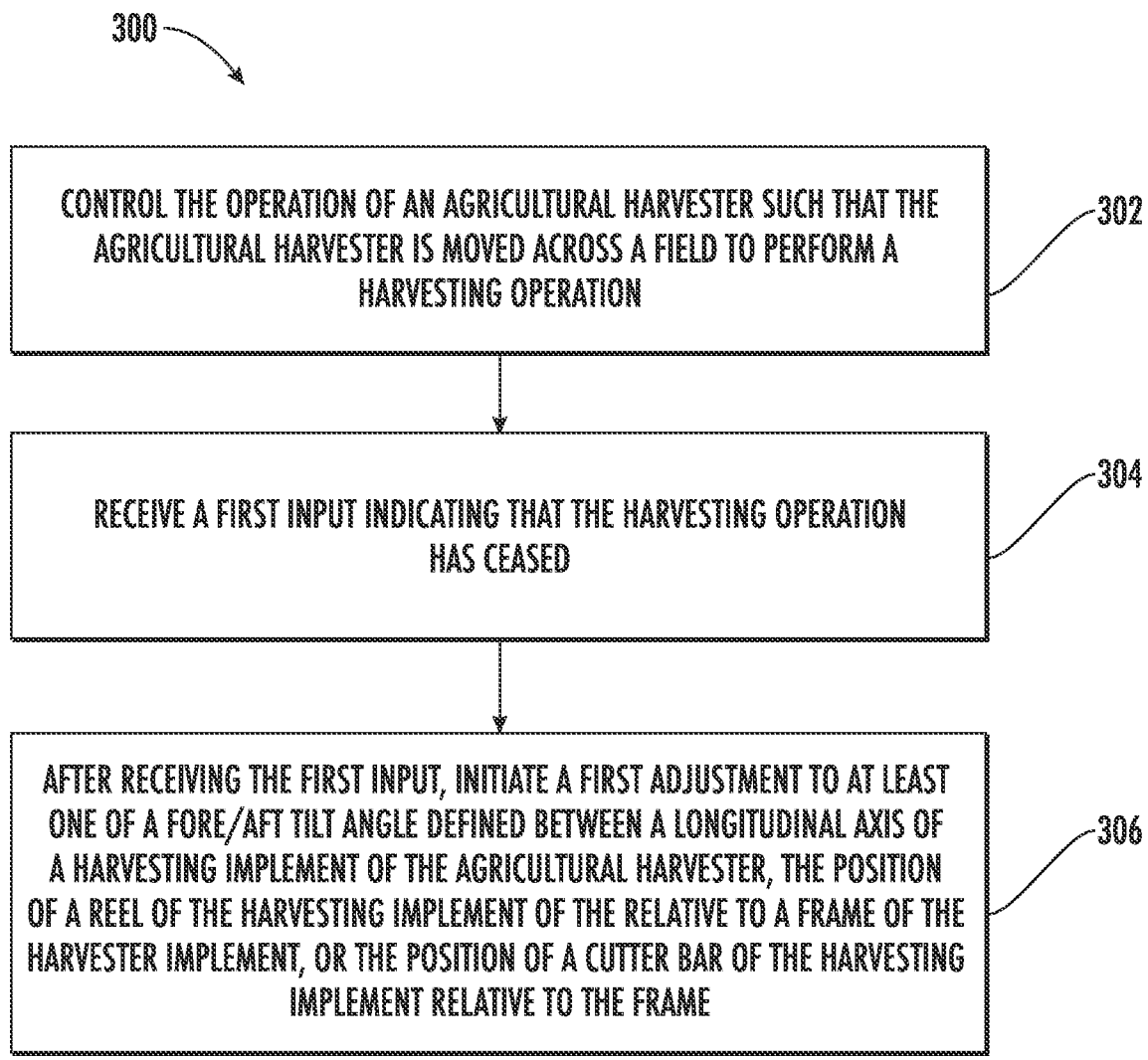
FIG. 6 illustrates a flow diagram of one embodiment of a method for controlling harvesting implement operation of an agricultural harvester in accordance with aspects of the present subject matter.

Referring now to FIG. 6, a flow diagram of one embodiment of a method 300 for controlling harvesting implement operation of an agricultural harvester is illustrated in accordance with aspects of the present subject matter. In general, the method 300 will be described herein with reference to the agricultural harvester 10, the header 100, and the system 200 described above with reference to FIGS. 1-5. However, it should be appreciated by those of ordinary skill in the art that the disclosed method 300 may generally be implemented with agricultural harvesters having any other suitable harvester configuration, with harvesting implements having any other suitable harvesting implement configuration, and/or within systems having any other suitable system configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 6, at (302), the method 300 may include controlling, with one or more computing devices, the operation of an agricultural harvester such that the agricultural harvester is moved across a field to perform a harvesting operation. For instance, as described above, the controller 214 may be configured to control the operation of one or more components of the agricultural harvester 10 (e.g., the engine 36, the transmission 38, and/or the crop-processing system 32) such that the harvester 10 is moved across a field to perform a harvesting operation thereon.

Additionally, at (304), the method 300 may include receiving, with the one or more computing devices, a first input indicating that the harvesting operation has ceased. For instance, as described above, the controller 214 may be configured to receive an input (e.g., from the location sensor 212 or the user interface 222) indicating that the harvesting operation being performed by the harvester 10 has ceased.

Moreover, as shown in FIG. 6, at (306), after receiving the first input, the method 300 may include initiating, with the one or more computing devices, a first adjustment to at least one of a fore/aft tilt angle defined between the longitudinal axis of a harvesting implement of the agricultural harvester and a field surface, the position of a reel of the harvesting implement relative to a frame of the harvester implement, or the position of a cutter bar of the harvesting implement relative to the frame. For instance, as described above, after receiving the input, the controller 214 may be configured to initiate an adjustment to the fore/aft tilt angle 114 of the header 100 (e.g., by controlling the operation of the actuator (s) 206), the position of the reel 140 to a header frame 120 (e.g., by controlling the operation of the actuators 208, 210), and/or the position of a cutter bar 102 relative to the header frame 120 (e.g., by controlling the operation of the actuator (s) 206).

It is to be understood that the steps of the method 300 are performed by the controller 214 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 214 described herein, such as the method 300, is implemented in software code or instructions which are tangibly stored on a tangible computer readable medium. The controller 214 loads the software code or instructions via a direct interface with the computer readable medium or via a wired and/or wireless network. Upon loading and executing such software code or instructions by the controller 214, the controller 214 may perform any of the functionality of the controller 214 described herein, including any steps of the method 300 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for controlling harvesting implement operation of an agricultural harvester, the system comprising:
   a harvesting implement defining a longitudinal axis extending between a forward end of the harvesting implement and an aft end of the harvesting implement, the harvesting implement configured to be coupled to the agricultural harvester, the harvesting implement including a frame, a reel, and a cutter bar; and
   a controller that:
      receives a first input indicating that a harvesting operation has ceased; and
      in response to receiving the first input, initiates a first adjustment to at least one of a position of the harvesting implement relative to a feeder of the agricultural harvester by (i) adjusting a fore/aft tilt angle defined between the longitudinal axis of the harvesting implement and a field surface, (ii) adjusting a position of the reel relative to the frame along the longitudinal axis, or (iii) adjusting a position of the cutter bar relative to the frame.

2. The system of claim 1, wherein, when initiating the first adjustment, the controller is further configured to control an operation of an actuator such that the reel is moved rearward along the longitudinal axis relative to a forward direction of travel of the agricultural harvester.

3. The system of claim 1, wherein, when initiating the first adjustment, the controller is further configured to control an operation of an actuator such that the cutter bar is raised.

4. The system of claim 1, wherein, when initiating the first adjustment, the controller is further configured to control an operation of an actuator to pivot the harvesting implement relative to the feeder to adjust the fore/aft tilt angle such that the aft end of the harvesting implement is closer to the field surface than the forward end of the harvesting implement.

5. The system of claim 1, wherein the controller is further configured to control an operation of an actuator to raise the frame of the harvesting implement relative to the field surface after initiating the first adjustment.

6. The system of claim 1, wherein the controller is further configured to:
   receive a second input indicating that the harvesting operation has been resumed; and
   initiate a second adjustment to at least one of the position of the harvesting implement relative to the feeder such that the fore/aft tilt angle is adjusted, an operating parameter of the reel, or an operating parameter of the cutter bar upon receipt of the second input.

7. The system of claim 6, wherein the controller is further configured to control an operation of an actuator to lower the frame of the harvesting implement relative to the field surface after initiating the second adjustment.

8. The system of claim 1, wherein the controller is further configured to receive the first input from an operator of the agricultural harvester.

9. The system of claim 1, wherein the controller is further configured to receive the first input from a location sensor.

10. The system of claim 2, wherein, when initiating the first adjustment, the controller is further configured to control the operation of the actuator to slide the reel rearward along a support arm of the harvesting implement.

11. The system of claim 3, wherein, when initiating the first adjustment, the controller is further configured to control the operation of the actuator to pivot an arm pivotably coupled to the frame relative to the frame such that the cutter bar is raised.

12. A method for controlling harvesting implement operation of an agricultural harvester, the agricultural harvester including a harvesting implement defining a longitudinal axis extending between a forward end of the harvesting implement and an aft end of the harvesting implement, the harvesting implement configured to be coupled to the agricultural harvester, the harvesting implement including a frame, a reel, and a cutter bar, the method comprising:
   controlling, with one or more computing devices, an operation of the agricultural harvester such that the agricultural harvester is moved across a field to perform a harvesting operation;
   receiving, with the one or more computing devices, a first input indicating that the harvesting operation has ceased; and
   in response to receiving the first input, initiating, with the one or more computing devices, a first adjustment to at least one of a position of the harvesting implement relative to a feeder of the agricultural harvester by (i) adjusting a fore/aft tilt angle defined between the longitudinal axis of the harvesting implement and a field surface, (ii) adjusting a position of the reel relative to the frame along the longitudinal axis, or (iii) adjusting a position of the cutter bar relative to the frame.

13. The method of claim 12, wherein initiating the first adjustment comprises controlling, with the one or more computing devices, an operation of an actuator such that the reel is moved rearward along the longitudinal axis relative to a forward direction of travel of the agricultural harvester.

14. The method of claim 12, wherein initiating the first adjustment comprises controlling, with the one or more computing devices, an operation of an actuator such that the cutter bar is raised.

15. The method of claim 12, wherein initiating the first adjustment comprises controlling, with the one or more computing devices, an operation of an actuator to pivot the harvesting implement relative to the feeder to adjust to the fore/aft tilt angle such that the aft end of the harvesting implement is closer to the field surface than the forward end of the harvesting implement.

16. The method of claim 12, further comprising:
after initiating the first adjustment, controlling, with the one or more computing devices, an operation of an actuator to raise the frame of the harvesting implement relative to the field surface.

17. The method of claim 12, further comprising:
receiving, with the one or more computing devices, a second input indicating that the harvesting operation has been resumed; and
after receiving the second input, initiating, with the one or more computing devices, a second adjustment to at least one of the position of the harvesting implement relative to the feeder such that the fore/aft tilt angle is adjusted, an operating parameter of the reel, or an operating parameter of the cutter bar.

18. The method of claim 17, further comprising:
after initiating the second adjustment, controlling, with the one or more computing devices, an operation of an actuator to lower the frame of the harvesting implement relative to a field surface.

19. The method of claim 12, wherein receiving the first input comprising:
receiving, with the one or more computing devices, the first input from an operator of the agricultural harvester.

20. The method of claim 12, wherein receiving the first input comprising:
receiving, with the one or more computing devices, the first input from a location sensor.

* * * * *